United States Patent
Patel et al.

(10) Patent No.: US 11,479,708 B2
(45) Date of Patent: *Oct. 25, 2022

(54) CROSS-LINKED POLYROTAXANES AND THEIR APPLICATION IN CEMENT

(71) Applicant: Saudi Arabian Oil Company, Dhahran (SA)

(72) Inventors: Hasmukh A. Patel, Houston, TX (US); Peter Boul, Houston, TX (US); Carl Thaemlitz, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 428 days.

This patent is subject to a terminal disclaimer.

(21) Appl. No.: 16/668,730

(22) Filed: Oct. 30, 2019

(65) Prior Publication Data

US 2021/0130676 A1 May 6, 2021

(51) Int. Cl.
  *C09K 8/467* (2006.01)
  *C04B 24/38* (2006.01)
  *C08G 83/00* (2006.01)
  *C04B 103/50* (2006.01)

(52) U.S. Cl.
  CPC .............. *C09K 8/467* (2013.01); *C04B 24/38* (2013.01); *C08G 83/007* (2013.01); *C04B 2103/50* (2013.01)

(58) Field of Classification Search
  None
  See application file for complete search history.

(56) References Cited

U.S. PATENT DOCUMENTS

| 10,060,242 | B2 | 8/2018 | Benoit et al. |
| 11,230,497 | B2* | 1/2022 | Patel ................... C04B 24/10 |
| 11,279,864 | B2* | 3/2022 | Patel .................. C04B 24/2641 |
| 2009/0312491 | A1 | 12/2009 | Ito et al. |
| 2017/0350225 | A1* | 12/2017 | Benoit ................. E21B 47/092 |
| 2020/0325070 | A1 | 10/2020 | Patel et al. |

FOREIGN PATENT DOCUMENTS

| CN | 109133754 | 1/2019 |
| JP | 2016088878 | 5/2016 |

OTHER PUBLICATIONS

PCT International Search Report and Written Opinion in International Appln. No. PCT/US2020/057866, dated Feb. 16, 2021, 13 pages.

* cited by examiner

*Primary Examiner* — John J Figueroa
(74) *Attorney, Agent, or Firm* — Fish & Richardson P.C.

(57) ABSTRACT

This document relates to methods for preventing or inhibiting the formation of micro-cracks and fractures in the cement of an oil well using cement compositions that contain cross-linked polyrotaxane additives. The cement compositions containing the cross-linked polyrotaxane additives exhibit increased stiffness without suffering a decrease in compressive strength, as compared to the same cement without the cross-linked polyrotaxane additive.

66 Claims, 4 Drawing Sheets

CROSS-LINKED POLYROTAXANES AND THEIR APPLICATION IN CEMENT

TECHNICAL FIELD

This disclosure describes improvements to wellbore cements and methods for using such improved wellbore cements.

BACKGROUND

Well cementing is an important operation during drilling and completion of oil wells. The cement sheath must maintain well integrity behind the casing and provide long-term zonal isolation to ensure safety and prevent environmental problems. The cement placed in the annulus between the casing and the formation experiences frequent stresses, such as varying or extreme temperatures and pressures. These frequent stresses can deteriorate the mechanical properties of the cement over a period of time and lead to the formation and propagation of micro-cracks and fractures, thus affecting the production and increasing the cost of operation.

Since cement tends to fracture under downhole conditions due to the brittleness of the cement in its neat form, polymeric additives, for example, latex, have been utilized to improve the mechanical properties of set cements. Traditional polymeric additives typically do not have strong interactions with the cement particles and instead form weak, interfacial interactions and lack the ability to distribute stress. Such interactions can be separated or ruptured under stresses frequently encountered in downhole conditions, resulting in uneven distribution of stresses in the cement matrix and disruption of the polymer chains. Once the polymer chains are broken, the fracture can propagate in the cement and can eventually result in a reduction or loss of the mechanical properties necessary to sustain the downhole conditions.

Therefore, there is a need for additives and methods that improve the mechanical properties of cement, particularly stiffness under the downhole conditions, for adequate long-term zonal isolation in oil wells.

SUMMARY

Provided in this disclosure are cross-linked polyrotaxane additives, cement compositions, and methods for treating subterranean formations. The cement compositions containing the cross-linked polyrotaxane additives exhibit increased stiffness and a reduction in fractures and the propagation of micro-cracks, without suffering a decrease in compressive strength, as compared to the same cement without the cross-linked polyrotaxane additive. Also provided are methods of using such cement compositions in the long-term zonal isolation of oil wells.

Provided in this disclosure is a cement composition that contains cement and a cross-linked polyrotaxane additive, the cross-linked polyrotaxane additive including a polyrotaxane containing a linear polymer and at least one ring compound, where the linear polymer is threaded through the opening of the ring compound, and a cross-linker.

In some embodiments, the linear polymer is selected from the group consisting of a polyethylene glycol (PEG), a propylene glycol (PPG), a block copolymer of PEG and PPG, and a polysiloxane (PS). In some embodiments, the linear polymer terminates with one or more of —NH$_2$, —COOH, —OH, —CH$_2$=CH$_2$, —COCH$_2$(CH$_3$)=CH$_2$, —SH, —COCl, or a halide. In some embodiments, the halide is selected from among —F, —Cl, —Br, and —I. In some embodiments, the linear polymer is a PEG or a polysiloxane that terminates with one or more —NH$_2$ groups. In some embodiments, the linear polymer is a PEG or a polysiloxane that terminates with one or more —COOH groups. In some embodiments, the linear polymer has a molecular weight of about 2000 g/mol to about 50000 g/mol, about 8000 g/mol to about 30,000 g/mol, or about 15,000 g/mol to about 25,000 g/mol. In some embodiments, the linear polymer has a molecular weight of about 20,000 g/mol, about 25,000 g/mol, or about 28,000 g/mol.

In some embodiments, the ring compound is a cyclodextrin or cyclodextrin derivative. In some embodiments, the cyclodextrin is selected from the group consisting of α-cyclodextrin (α-CD), δ-cyclodextrin (β-CD), and γ-cyclodextrin (γ-CD) and combinations thereof. In some embodiments, the amount of ring compound in the polyrotaxane is between about 20% to about 70%, about 50% to about 60%, or about 30% to about 40% by weight of the polyrotaxane.

In some embodiments, the polyrotaxane containing the linear polymer and one or more ring compounds is selected from the group consisting of γ-CD-PS-NH$_2$, γ-CD-PS-COOH, β-CD-PPG-NH$_2$, and α-CD-PEG-NH$_2$.

In some embodiments, the polyrotaxane includes a stopper group at one or both ends of the linear polymer. In some embodiments, the stopper group is selected from the group consisting of a dinitrofluorophenyl group, a cyclodextrin, a nitrophenol, and combinations thereof. In some embodiments, the stopper group is p-nitrophenol (PNP) or 2,4-dinitrofluorobenzene (DNF). In some embodiments, the polyrotaxane containing one or more stopper groups is α-CD-PEG-NH-DNF or γ-CD-PS-COOH-PNP.

In some embodiments, two or more polyrotaxanes of the present disclosure are cross-linked. In some embodiments, the cross-linker is selected from the group consisting of trimesoyl chloride, formaldehyde, cyanuric chloride (CC), and bisphenol A diglycidyl ether (DGE). In some embodiments, the amount of cross-linker in the cross-linked polyrotaxane additive is between about 1% to about 10%, or about 2% to about 7%, or about 2% to about 4% by weight of the cross-linked polyrotaxane additive.

In some embodiments, the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, where P is a polymer obtained from self-polymerization of the polyrotaxane. In some embodiments, the cross-linked polyrotaxane additive is γ-CD-PS-COOH-P.

In some embodiments, the amount of cross-linked polyrotaxane additive in the cement composition is between about 0.1% to about 6%, about 1% to about 4%, or about 2% to about 3% by weight of the cement composition. In some embodiments, the amount of cross-linked polyrotaxane additive in the cement composition is about 0.8% to about 1% by weight of the cement composition.

In some embodiments, the cement composition contains one or more of a suspending agent or an anti-foaming agent. In some embodiments, the cement composition contains water. In some embodiments, the ratio of cement to water in the cement composition is about 50:50, about 60:40, or about 70:30 wt/v.

In some embodiments, the cement composition has a Young's modulus of about 0.1 GPa to about 40 GPa, about 3 GPa to about 25 GPa, or about 5 GPa to about 20 GPa at a pressure of about 0.1 MPa to about 150 MPa, about 10 MPa to about 100 MPa, or about 20 MPa to about 40 MPa, at a temperature of about 77° F. to about 450° F., about 125°

F. to about 350° F., or about 150° F. to about 200° F. In some embodiments, the cement composition has a Young's modulus of about 5 GPa to about 10 GPa at a pressure of about 20 MPa and a temperature of about 180° F.

In some embodiments, the cement composition has a compressive strength of about 1000 psi to about 10,000 psi, about 2000 psi to about 8000 psi, or about 3500 psi to about 6500 psi, at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a compressive strength of about 4500 psi to about 5500 psi at a pressure of about 20 MPa and a temperature of about 180° F.

In some embodiments, the cement composition exhibits improved stiffness as compared to the same composition without the cross-linked polyrotaxane additive.

Also provided in the present disclosure is a method of preparing a cement composition, the method including a) reacting a polyrotaxane containing a linear polymer and at least one ring compound, where the linear polymer is threaded through the opening of the ring compound, with a cross-linker to form a cross-linked polyrotaxane additive; and b) mixing the cross-linked polyrotaxane additive with cement.

In some embodiments of the method, the linear polymer is selected from the group consisting of a polyethylene glycol (PEG), a propylene glycol (PPG), a block copolymer of PEG and PPG, and a polysiloxane (PS). In some embodiments, the linear polymer terminates with one or more of —$NH_2$, —COOH, —OH, —$CH_2$=$CH_2$, —$COCH_2(CH_3)$=$CH_2$, —SH, —COCl, or a halide. In some embodiments, the halide is selected from among —F, —Cl, —Br, and —I. In some embodiments, the linear polymer has a molecular weight of about 2000 g/mol to about 50000 g/mol, about 8000 g/mol to about 30,000 g/mol, or about 15,000 g/mol to about 25,000 g/mol.

In some embodiments of the method, the ring compound is a cyclodextrin or cyclodextrin derivative. In some embodiments, the cyclodextrin is selected from the group consisting of α-cyclodextrin (α-CD), β-cyclodextrin (β-CD), and γ-cyclodextrin (γ-CD) and combinations thereof.

In some embodiments, the amount of ring compound in the polyrotaxane is between about 20% to about 70%, about 50% to about 60%, or about 30% to about 40% by weight of the polyrotaxane.

In some embodiments of the method, the polyrotaxane is selected from the group consisting of γ-CD-PS-$NH_2$, γ-CD-PS-COOH, β-CD-PPG-$NH_2$, and α-CD-PEG-$NH_2$.

In some embodiments of the method, the polyrotaxane includes a stopper group at one or both ends of the linear polymer. In some embodiments, the stopper group is selected from the group consisting of a dinitrofluorophenyl group, a cyclodextrin, a nitrophenol, and combinations thereof. In some embodiments, the stopper group is p-nitrophenol (PNP) or 2,4-dinitrofluorobenzene (DNF). In some embodiments, the polyrotaxane is α-CD-PEG-NH-DNF or γ-CD-PS-COOH-PNP.

In some embodiments of the method, the cross-linker is selected from the group consisting of trimesoyl chloride, formaldehyde, cyanuric chloride (CC), and bisphenol A diglycidyl ether (DGE). In some embodiments, the amount of cross-linker in the cross-linked polyrotaxane additive is between about 1% to about 10%, or about 2% to about 7%, or about 2% to about 4% by weight of the cross-linked polyrotaxane additive.

In some embodiments of the method, the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, where P is a polymer obtained from self-polymerization of the polyrotaxane. In some embodiments, the cross-linked polyrotaxane additive is γ-CD-PS-COOH-P.

In some embodiments of the method, the amount of cross-linked polyrotaxane additive in the cement composition is between about 0.1% to about 6%, about 1% to about 4%, or about 2% to about 3% by weight of the cement composition.

In some embodiments of the method, the cement composition contains one or more of a suspending agent or an anti-foaming agent. In some embodiments, the cement composition contains water. In some embodiments, the ratio of cement to water in the cement composition is about 50:50, about 60:40, or about 70:30 wt/v.

Also provided in the present disclosure is a method for preventing the formation of micro-cracks and fractures in the cement of an oil well, the method including providing to the oil well a cement composition containing cement and a cross-linked polyrotaxane additive, such as a cross-linked polyrotaxane additive of the present disclosure. In some embodiments, the cross-linked polyrotaxane additive includes a polyrotaxane containing a linear polymer having a molecular weight of about 2000 g/mol to about 50000 g/mol, and at least one ring compound, where the linear polymer is threaded through the opening of the ring compound; and a cross-linker.

In some embodiments of the method, the linear polymer is selected from the group consisting of a polyethylene glycol (PEG), a propylene glycol (PPG), a block copolymer of PEG and PPG, and a polysiloxane (PS). In some embodiments, the linear polymer terminates with one or more of —$NH_2$, —COOH, —OH, —$CH_2$=$CH_2$, —$COCH_2(CH_3)$=$CH_2$, —SH, —COCl, or a halide.

In some embodiments of the method, the ring compound is a cyclodextrin selected from the group consisting of α-cyclodextrin (α-CD), β-cyclodextrin (β-CD), and γ-cyclodextrin (γ-CD) and combinations thereof.

In some embodiments of the method, the polyrotaxane is selected from the group consisting of γ-CD-PS-$NH_2$, γ-CD-PS-COOH, β-CD-PPG-$NH_2$, and α-CD-PEG-$NH_2$.

In some embodiments of the method, the polyrotaxane includes a stopper group at one or both ends of the linear polymer. In some embodiments, the stopper group is selected from the group consisting of a dinitrofluorophenyl group, a cyclodextrin, a nitrophenol, and combinations thereof. In some embodiments, the polyrotaxane is α-CD-PEG-NH-DNF or γ-CD-PS-COOH-PNP.

In some embodiments of the method, the cross-linker is selected from the group consisting of trimesoyl chloride, formaldehyde, cyanuric chloride (CC), and bisphenol A diglycidyl ether (DGE). In some embodiments, the amount of cross-linker in the cross-linked polyrotaxane additive is between about 1% to about 10%, or about 2% to about 7%, or about 2% to about 4% by weight of the cross-linked polyrotaxane additive.

In some embodiments of the method, the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, where P is a polymer obtained from self-polymerization of the polyrotaxane. In some embodiments, the amount of cross-linked polyrotaxane additive in the cement composition is between about 0.1% to about 6%, about 1% to about 4%, or about 2% to about 3% by weight of the cement composition.

In some embodiments of the method, the cement composition includes one or more of a suspending agent or an anti-foaming agent. In some embodiments, the cement composition contains water. In some embodiments, the ratio of cement to water in the cement composition is about 50:50, about 60:40, or about 70:30 wt/v.

DESCRIPTION OF DRAWINGS

FIG. 1A illustrates the mechanism of stress distribution of covalently cross-linked polymers in set cement, which can result in the breaking of cross-links between the polymer chains. FIG. 1B illustrates the stress distribution mechanism in set cements containing cross-linked polyrotaxanes.

FIG. 2A shows exemplary ring components α-cyclodextrin (α-CD), β-cyclodextrin (β-CD), and γ-cyclodextrin (γ-CD). FIG. 2B shows exemplary linear polymers that include a polyethylene glycol (PEG; top), a polypropylene glycol (PPG; middle), and a polysiloxane (PS; bottom), where R is $-NH_2$, $-COOH$, $-OH$, $-CH_2=CH_2$, $-COCH_2(CH_3)=CH_2$, $-SH$, $-COCl$, a halide, and combinations thereof. FIG. 2C shows a representative polymer, which is a linear polymer.

DETAILED DESCRIPTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

The present application provides compositions, such as cement compositions containing cross-linked polyrotaxane additives, and methods for improving the stiffness and elastic properties of cement while having minimum impact on the compressive strength (that is, toughness). The cement compositions of the present disclosure include covalently-linked chemical structures called polyrotaxanes. The polyrotaxanes are made up of a linear polymer and a ring compound. These structures contain a movable cross-linked mechanical bond that allows the polymer chains to slide within the material. This is unlike conventional polymeric additives that contain permanently-linked covalent bonds that restrict the motion of the polymer chains. Without wishing to be bound by any particular theory, it is believed that the sliding characteristics of the polyrotaxane structures facilitate the dispersion of stresses throughout the set cement matrix, whereas the links in conventional polymers tend to break over repeated cycles of stresses.

Figure 1A:
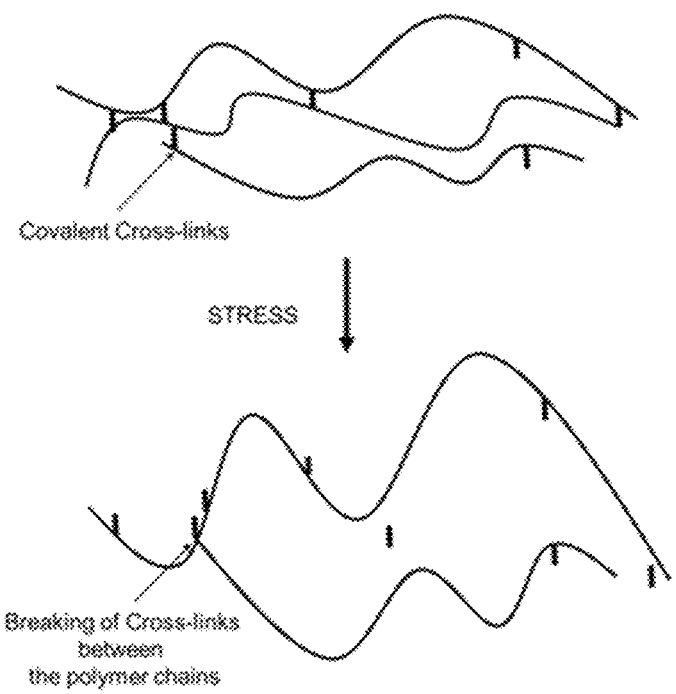
FIGS. 1A-1B show the mechanism of stress distribution in conventional and cross-linked polyrotaxanes in set cement.
Figure 1B:
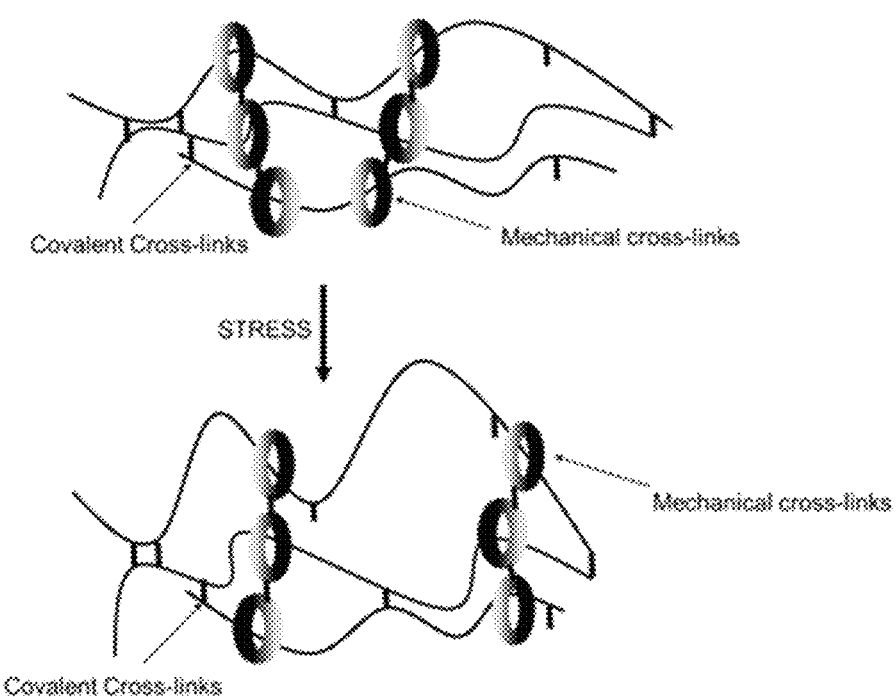

In addition to enhancing stress distribution in cement, the cross-linked polyrotaxane structures of the present disclosure provide the ability to restrict the propagation of micro-cracks and thus resist the failure of the mechanical properties of the set cement. As shown in FIG. 1A, the cross-links between polymeric chains of traditional covalently linked polymeric additives eventually break under repeated stress under downhole conditions, as the stresses are concentrated on the short chains. By contrast, as shown in FIG. 1B, the covalent and mechanical cross-links of the presently disclosed polyrotaxane structures remain intact after experiencing stress. The molecular level effects originating from the sliding motion through threaded rings, a pulley effect, result in uniform dispersion of stresses in the cement matrix. The blending of crossed-linked polyrotaxanes in the cement imparts the improvement in the mechanical properties, especially stiffness. Due to the sliding motion of the polyrotaxanes, the addition of these additives into cement thus improves the distribution of stresses throughout the matrix of set cement and restricts the formation and propagation of micro-cracks and fractures generated under extreme conditions.

Thus, the materials described in the present disclosure restrict the formation of micro-cracks, propagation of fracture, and improve the stiffness of the set cement.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used herein, the term "polyrotaxane" refers to a compound having cyclic molecules, a linear molecule included in the cyclic molecules such that the linear molecule is threaded through the cyclic molecules. In some embodiments, there are stopper groups disposed at both ends of the linear molecule so as to prevent the cyclic molecules from separating from the linear molecule. The cyclic molecules can move along the axle.

A "cross-linked polyrotaxane" or "cross-linked polyrotaxane additive" refers to a structure made up of cross-linked polyrotaxanes.

As used in this disclosure, a "cement" is a binder, for example, a substance that sets and forms a cohesive mass with measurable strengths. A cement can be characterized as non-hydraulic or hydraulic. Non-hydraulic cements (for example, Sorel cements) harden because of the formation of complex hydrates and carbonates, and may require more than water to achieve setting, such as carbon dioxide or mixtures of specific salt combinations. Additionally, too much water cannot be present, and the set material must be kept dry in order to retain integrity and strength. A non-hydraulic cement produces hydrates that are not resistant to water. Hydraulic cements (for example, Portland cement) harden because of hydration, which uses only water in addition to the dry cement to achieve setting of the cement. Cement hydration products, chemical reactions that occur independently of the mixture's water content, can harden even underwater or when constantly exposed to wet weather. The chemical reaction that results when the dry cement powder is mixed with water produces hydrates that are water-soluble. Any cement can be used in the compositions of the present application.

As used in this disclosure, the term "set" can mean the process of a fluid slurry (for example, a cement slurry) becoming a hard solid. Depending on the composition and the conditions, it can take just a few minutes up to 72 hours or longer for some cement compositions to initially set.

"Mechanical properties" of cement refer to the properties that contribute to the overall behavior of the cement when subjected to an applied force, such as the frequent stresses cement is exposed to that impact its ability to both protect the casing and maintain zonal isolation. Mechanical properties of cement include compressive strength, elastic strength or the elastic modulus (that is, Young's Modulus), Poisson's ratio (the ratio of lateral strain to longitudinal strain in a material subjected to loading), and tensile strength.

The term "compressive strength" or "compression strength" refer to the measure of the cement's ability to resist loads which tend to compress it or reduce size. Cement composition compressive strengths can vary from 0 psi to over 10,000 psi (0 to over 69 MPa). Compressive strength is generally measured at a specified time after the composition has been mixed and at a specified temperature and pressure. In some embodiments, compressive strength is measured by a non-destructive method that continually measures correlated compressive strength of a cement composition sample throughout the test period by utilizing a non-destructive sonic device. For example, compressive strength of a cement composition can be measured using the non-destructive method according to ANSI/API Recommended Practice 10-B2 at a specified time, temperature, and pressure.

"Elastic strength," as used in this disclosure, describes the ability of the cement to resist permanent deformation when force is applied. Elastic strength is also referred to as Young's Modulus.

As used in this disclosure, "zonal isolation" means the prevention of fluids, such as water or gas, in one zone of a well or subterranean formation, from mixing with oil in another zone.

The term "downhole," as used in this disclosure, can refer to under the surface of the earth, such as a location within or fluidly connected to a wellbore.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

Cross-Linked Polyrotaxanes

Provided in this disclosure are cross-linked polyrotaxanes that are made up of a polyrotaxane and a cross-linker, where the polyrotaxane contains a linear polymer and at least one ring compound, where the linear polymer is threaded through the opening of the ring compound. In some embodiments, the linear polymer is selected from the group consisting of a polyethylene glycol (PEG), a propylene glycol (PPG), a block copolymer of PEG and PPG, and a polysiloxane (PS). In some embodiments, the ring compound is a cyclodextrin or cyclodextrin derivative. In some embodiments, the cross-linker is selected from the group consisting of trimesoyl chloride, formaldehyde, cyanuric chloride (CC), and bisphenol A diglycidyl ether (DGE).

Linear Polymers

The linear polymer that can be included in the polyrotaxanes of the present disclosure can be any linear polymer that can be included in a ring compound such that the linear polymer is threaded through the opening of the ring compound.

Examples of the suitable linear polymers include, but are not limited to, polyvinyl alcohol, polyvinylpyrrolidone, poly(meth)acrylic acid, cellulose resins (for example, carboxymethylcellulose, hydroxyethylcellulose, and hydroxypropylcellulose), polyacrylamide, polyethylene glycol, polypropylene glycol, polyvinyl acetal resins, polyvinyl methyl ether, polyamine, polyethyleneimine, casein, gelatin, starch, and copolymers thereof; polyolefin resins such as polyethylene and polypropylene; polyester resins; polyvinyl chloride resins; polystyrene resins such as polystyrene and acrylonitrile-styrene copolymer resins; acrylic resins such as polymethyl methacrylate, (meth)acrylate copolymers, and acrylonitrile-methyl acrylate copolymer resins; polycarbonate resins; polyurethane resins; vinyl chloride-vinyl acetate copolymer resins; polyvinyl butyral resins; polyisobutylene; polytetrahydrofuran; polyaniline; acrylonitrile-butadiene-styrene copolymers (ABS resins); polyamides such as nylon; polyimides; polydienes such as polyisoprene and polybutadiene; polysiloxanes such as polydimethylsiloxane; polysulfones; polyimines; polyacetic anhydrides; polyureas; polysulfides; polyphosphazenes; polyketones; polyphenylenes; polyhaloolefins; and derivatives of these resins. In some embodiments, the linear polymer is selected from the group consisting of a polyethylene glycol (PEG), a propylene glycol (PPG), a block copolymer of PEG and PPG, and a polysiloxane (PS). In some embodiments, the linear polymer is a PEG. In some embodiments, the linear polymer is a PS.

The linear molecules of the polyrotaxane can terminate with a functional group. In some embodiments, the functional group is selected from the group consisting of —NH$_2$, —COOH, —OH, —CH$_2$=CH$_2$, —COCH$_2$(CH$_3$)=CH$_2$, —SH, —COCl, and a halide (for example, —F, —Cl, —Br, or —I). In some embodiments, the functional group is —NH$_2$. In some embodiments, the functional group is —COOH. In some embodiments, the linear molecule terminates on each end with the same functional group. In some embodiments, the linear molecule terminates on one end with one functional group and on the other end with a different functional group. In some embodiments, the linear molecule is a PEG that terminates with one or more —NH$_2$ groups. In some embodiments, the linear molecule is a polysiloxane that terminates with one or more —NH$_2$ groups. In some embodiments, the linear molecule is a PEG that terminates with one or more —COOH groups. In some embodiments, the linear molecule is a polysiloxane that terminates with one or more —COOH groups.

In some particular embodiments, the linear polymer of the polyrotaxane of the present disclosure is selected from among the group consisting of a polyethylene glycol (PEG) having the structure:

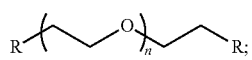

a polypropylene glycol (PPG) having the structure:

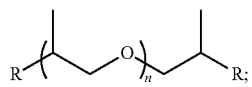

and a polysiloxane (PS) having the structure:

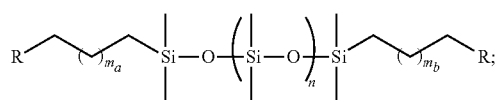

where R is selected from —NH$_2$, —COOH, —OH, —CH$_2$=CH$_2$, —COCH$_2$(CH$_3$)=CH$_2$, —SH, —COCl, and a halide; n is about 10 to about 1000; $m_a$ is about 10 to about 500; and $m_b$ is about 10 to about 500.

In some embodiments, the linear molecule has a molecular weight of about 2000 g/mol to about 50,000 g/mol, for example, about 2000 g/mol to about 45,000 g/mol, about 2000 g/mol to about 40,000 g/mol, about 2000 g/mol to about 35,000 g/mol, about 2000 g/mol to about 30,000 g/mol, about 2000 g/mol to about 25,000 g/mol, about 2000 g/mol to about 20,000 g/mol, about 2000 g/mol to about 15,000 g/mol, about 2000 g/mol to about 10,000 g/mol, about 2000 g/mol to about 8000 g/mol, about 2000 g/mol to about 5000 g/mol, about 5000 g/mol to about 50,000 g/mol, about 5000 g/mol to about 45,000 g/mol, about 5000 g/mol to about 40,000 g/mol, about 5000 g/mol to about 35,000 g/mol, about 5000 g/mol to about 30,000 g/mol, about 5000 g/mol to about 25,000 g/mol, about 5000 g/mol to about 20,000 g/mol, about 5000 g/mol to about 15,000 g/mol, about 5000 g/mol to about 10,000 g/mol, about 5000 g/mol to about 8000 g/mol, about 8000 g/mol to about 50,000 g/mol, about 8000 g/mol to about 45,000 g/mol, about 8000 g/mol to about 40,000 g/mol, about 8000 g/mol to about 35,000 g/mol, about 8000 g/mol to about 30,000 g/mol, about 8000 g/mol to about 25,000 g/mol, about 8000 g/mol to about 20,000 g/mol, about 8000 g/mol to about 15,000 g/mol, about 8000 g/mol to about 10,000 g/mol, about 10,000 g/mol to about 50,000 g/mol, about 10,000 g/mol to about 45,000 g/mol, about 10,000 g/mol to about 40,000 g/mol, about 10,000 g/mol to about 35,000 g/mol, about 10,000 g/mol to about 30,000 g/mol, about 10,000 g/mol to about 25,000 g/mol, about 10,000 g/mol to about 20,000 g/mol, about 10,000 g/mol to about 15,000 g/mol, about 15,000 g/mol to about 50,000 g/mol, about 15,000 g/mol to about 45,000 g/mol, about 15,000 g/mol to about 40,000 g/mol, about 15,000 g/mol to about 35,000 g/mol, about 15,000 g/mol to about 30,000 g/mol, about 15,000 g/mol to about 25,000 g/mol, about 15,000 g/mol to about 20,000 g/mol, about 20,000 g/mol to about 50,000 g/mol, about 20,000 g/mol to about 45,000 g/mol, about 20,000 g/mol to about 40,000 g/mol, about 20,000 g/mol to about 35,000 g/mol, about 20,000 g/mol to about 30,000 g/mol, about 20,000 g/mol to about 25,000 g/mol, about 25,000 g/mol to about 50,000 g/mol, about 25,000 g/mol to about 45,000 g/mol, about 25,000 g/mol to about 40,000 g/mol, about 25,000 g/mol to about 35,000 g/mol, about 25,000 g/mol to about 30,000 g/mol, about 30,000 g/mol to about 50,000 g/mol, about 30,000 g/mol to about 45,000 g/mol, about 30,000 g/mol to about 40,000 g/mol, about 30,000 g/mol to about 35,000 g/mol, about 35,000 g/mol to about 50,000 g/mol, about 35,000 g/mol to about 45,000 g/mol, about 35,000 g/mol to about 40,000 g/mol, about 40,000 g/mol to about 50,000 g/mol, about 40,000 g/mol to about 45,000 g/mol, about 45,000 g/mol to about 50,000 g/mol, or about 2000 g/mol, about 5000 g/mol, about 8000 g/mol, about 10,000 g/mol, about 15,000 g/mol, about 20,000 g/mol, about 25,000 g/mol, about 30,000 g/mol, about 35,000 g/mol, about 40,000 g/mol, about 45,000 g/mol, or about 50,000 g/mol. In some embodiments, the molecular weight of the linear molecule is about 2000 g/mol to about 5000 g/mol. In some embodiments, the molecular weight of the linear molecule is about 8000 g/mol to about 30,000 g/mol. In some embodiments, the molecular weight of the linear molecule is about 15,000 g/mol to about 25,000 g/mol. In some embodiments, the molecular weight of the linear molecule is about 20,000 g/mol. In some embodiments, the molecular weight of the linear molecule is about 25,000 g/mol. In some embodiments, the molecular weight of the linear molecule is about 28,000 g/mol.

Ring Compounds

The polyrotaxanes of the present disclosure include one or more ring compounds, where the linear polymer is threaded through the opening of the ring compound. The ring compound can be any ring compound that allows for threading of a linear polymer through the opening of the ring.

In some embodiments, the ring compound is a cyclodextrin or a cyclodextrin derivative. Examples of suitable ring compounds include, but are not limited to, α-cyclodextrin (α-CD), β-cyclodextrin (β-CD), γ-cyclodextrin (γ-CD), and derivatives thereof. Cyclodextrin derivatives are compounds obtained by substituting hydroxyl groups of cyclodextrin with polymer chains, substituents, or both. Examples of suitable polymer chains include, but are not limited to, polyethylene glycol, polypropylene glycol, polyethylene, polypropylene, polyvinyl alcohol, polyacrylate, polylactone, and polylactam. Examples of suitable substituents include, but are not limited to, hydroxyl, thionyl, amino, sulfonyl, phosphonyl, acetyl, alkyl groups (for example, methyl, ethyl, propyl, and isopropyl), trityl, tosyl, trimethylsilane, and phenyl.

Examples of suitable cyclodextrin and cyclodextrin derivatives include, but are not limited to, α-cyclodextrin (the number of glucose residues=6, inner diameter of opening=about 0.45 to 0.6 μm), β-cyclodextrin (the number of glucose residues=7, inner diameter of opening=about 0.6 to 0.8 μm), γ-cyclodextrin (the number of glucose residues=8, inner diameter of opening=about 0.8 to 0.95 μm), dimethyl cyclodextrin, glucosyl cyclodextrin, 2-hydroxypropyl-α-cyclodextrin, 2,6-di-O-methyl-α-cyclodextrin 6-O-α-maltosyl-α-cyclodextrin, 6-O-α-D-glucosyl-α-cyclodextrin, hexakis(2,3,6-tri-O-acetyl)-α-cyclodextrin, hexakis(2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2,(3)-O-(carboxylmethyl)]-α-cyclodextrin, octakis(6-O-t-butyldimethylsilyl)-α-cyclodextrin, succinyl-α-cyclodextrin, glucuronyl glucosyl-β-cyclodextrin, heptakis (2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)β-cyclodextrin, heptakis(2,3-di-O-methyl-6-O-sulfo)-β-cyclodextrin, heptakis(2,3,6-tri-O-acetyl)-β-cyclodextrin, heptakis(2,3,6-tri-O-benzoyl)-β-cyclodextrin, heptakis(2,3,6-tri-O-methyl)β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)-β-cyclodextrin, hexakis[6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-maltosyl-β-cyclodextrin, succinyl-β-cyclodextrin, succinyl-(2-hydroxypropyl)β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)2,3-di-O-acetyl]-β-cyclodextrin, 2-hydroxyethyl-γ-cyclodextrin, 2-hydroxypropyl-γ-cyclodextrin, butyl-γ-cyclodextrin, 3A-amino-3A-deoxy-(2AS, 3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3, 6-tri-O-methyl)-γ-cyclodextrin, octakis(2,6-di-O-phenyl)-γ-cyclodextrin, octakis(6-O-t-butyldimethylsilyl)-γ-cyclodextrin, and octakis(2,3,6-tri-O-acetyl)-γ-cyclodextrin. The ring compounds, such as the cyclodextrins listed in the present disclosure, can be used alone or in combination of two or more.

In some embodiments, the ring compound is α-cyclodextrin having the structure:

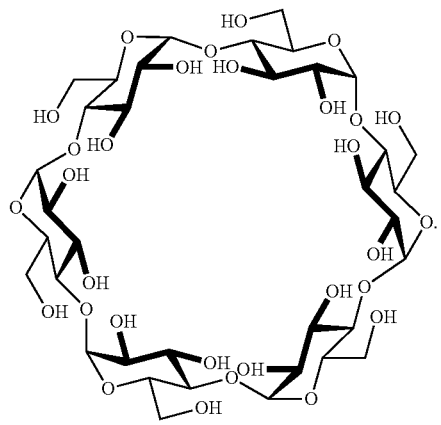 [SMILES: OCC1O[C@@H]2O[C@@H]3C(CO)O[C@H](O[C@@H]4C(CO)O[C@H](O[C@@H]5C(CO)O[C@H](O[C@@H]6C(CO)O[C@H](O[C@@H]7C(CO)O[C@H](O[C@H]1[C@H](O)[C@H]2O)[C@H](O)[C@H]7O)[C@H](O)[C@H]6O)[C@H](O)[C@H]5O)[C@H](O)[C@H]4O)[C@H](O)[C@H]3O]

In some embodiments, the ring compound is β-cyclodextrin having the structure:

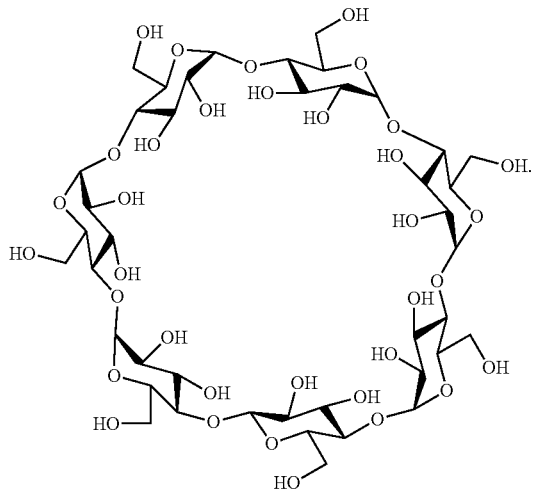 [SMILES: OCC1O[C@@H]2O[C@@H]3C(CO)O[C@H](O[C@@H]4C(CO)O[C@@H](O[C@@H]5C(CO)O[C@H](O[C@@H]6C(CO)O[C@@H](O[C@@H]7C(CO)O[C@H](O[C@@H]8C(CO)O[C@H](O[C@H]1C(O)C2O)C(O)C8O)C(O)C7O)C(O)C6O)C(O)C5O)C(O)C4O)C(O)C3O]

In some embodiments, the ring compound is γ-cyclodextrin having the structure:

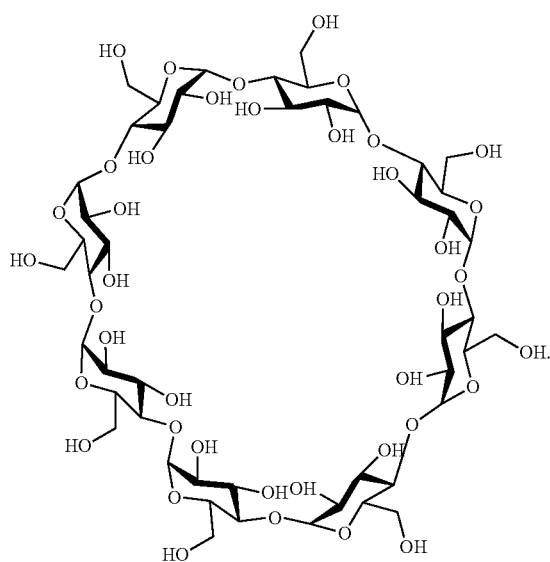 [SMILES: OCC1O[C@@H]2O[C@@H]3C(CO)O[C@H](O[C@@H]4C(CO)O[C@H](O[C@@H]5C(CO)O[C@@H](O[C@@H]6C(CO)O[C@@H](O[C@@H]7C(CO)O[C@H](O[C@@H]8C(CO)O[C@H](O[C@@H]9C(CO)O[C@H](O[C@H]1[C@H](O)C2O)C(O)[C@H]9O)C(O)[C@H]8O)C(O)[C@H]7O)C(O)[C@H]6O)C(O)[C@H]5O)C(O)[C@H]4O)C(O)[C@H]3O]

In some embodiments, the amount of ring compound on the polymer chain is about 20 wt % to about 70 wt %, such as about 20 wt % to about 65 wt %, about 20 wt % to about 60 wt %, about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 70 wt %, about 25 wt % to about 65 wt %, about 25 wt % to about 60 wt %, about 25 wt % to about 55 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 70 wt %, about 30 wt % to about 65 wt %, about 30 wt % to about 60 wt %, about 30 wt % to about 55 wt %, about 30 wt % to about 50 wt %, about 30 wt % to about 45 wt %, about 30 wt % to about 40 wt %, about 30 wt % to about 35 wt %, about 35 wt % to about 70 wt %, about 35 wt % to about 65 wt %, about 35 wt % to about 60 wt %, about 35 wt % to about 55 wt %, about 35 wt % to about 50 wt %, about 35 wt % to about 45 wt %, about 35 wt % to about 40 wt %, about 40 wt % to about 70 wt %, about 40 wt % to about 65 wt %, about 40 wt % to about 60 wt %, about 40 wt % to about 55 wt %, about 40 wt % to about 50 wt %, about 40 wt % to about 45 wt %, about 45 wt % to about 70 wt %, about 45 wt % to about 65 wt %, about 45 wt % to about 60 wt %, about 45 wt % to about 55 wt %, about 45 wt % to about 50 wt %, about 50 wt % to about 70 wt %, about 50 wt % to about 65 wt %, about 50 wt % to about 60 wt %, about 50 wt % to about 55 wt %, about 55 wt % to about 70 wt %, about 55 wt % to about 65 wt %, about 55 wt % to about 60 wt %, about 60 wt % to about 70 wt %, about 60 wt % to about 65 wt %, about 65 wt % to about 70 wt %, or about 20 wt %, about 25 wt %, about 30 wt %, about 35 wt %, about 40 wt %, about 45 wt %, about 50 wt %, about 55 wt %, about 60 wt %, about 65 wt %, or about 70 wt %. In some embodiments, the amount of ring compound on the polymer chain is about 20 wt % to about 70 wt %. In some embodiments, the amount of ring compound on the polymer chain is about 50 wt % to about 60 wt %. In some embodiments, the amount of ring compound on the polymer chain is about 30 wt % to about 40 wt %. In some embodiments, the ring compound is a cyclodextrin or cyclodextrin derivative and the amount on the polymer chain is about 20 wt % to about 70 wt %. In some embodiments, the ring compound is a cyclodextrin or cyclodextrin derivative and the amount on the polymer chain is about 50 wt % to about 60 wt %.

Polyrotaxanes and Amount of Inclusion

The polyrotaxanes of the present disclosure contain a linear polymer, for example, polyethylene glycol (PEG), polypropylene glycol (PPG), block copolymers of PEG and PPG, and polysiloxanes (PS) that were terminated with one or more of —$NH_2$, —COOH, —OH, —$CH_2$=$CH_2$, —$COCH_2(CH_3)$=$CH_2$, —SH, —COCl, and halides; and ring components that include, for example, α-cyclodextrin (α-CD), β-cyclodextrin (β-CD), and γ-cyclodextrin (γ-CD). In some embodiments, the polyrotaxane is selected from γ-CD-PS-$NH_2$, γ-CD-PS-COOH, α-CD-PEG-$NH_2$, α-CD-PEG-NH-DNF, β-CD-PPG-$NH_2$, and γ-CD-PS-COOH-PNP. In some embodiments, the inclusion complex the polyrotaxane is selected from the group consisting of γ-CD-PS-$NH_2$, γ-CD-PS-COOH, β-CD-PPG-$NH_2$, and α-CD-PEG-$NH_2$.

In some embodiments, where a plurality of ring compounds include a linear polymer such that the linear polymer is threaded through the ring compounds, when the maximum amount of inclusion of one linear polymer in the ring compound is 1, the ring compounds can include the linear polymer in an amount of 0.001 to 0.6, such as 0.01 to 0.5, or 0.05 to 0.4.

The maximum amount of inclusion in the ring compounds can be calculated from the length of the linear polymer and the thickness of the ring compounds. For example, when the linear polymer is polyethylene glycol and the ring compounds are α-cyclodextrin molecules, the maximum amount of inclusion has been experimentally determined (see, for example, Macromolecules (1993) 26:5698-5703).

Stopper Group

In some embodiments, the polyrotaxane includes one or two stopper groups. The stopper groups can be any group that is disposed at either or both ends of a linear polymer and act to prevent separation of the ring compounds.

Examples of suitable stopper groups include, but are not limited to, dinitrophenyl groups, cyclodextrins, adamantane groups, trityl groups, fluoresceins, pyrenes, substituted benzenes, optionally substituted polynuclear aromatics, and steroids. Examples of substituents include, but are not limited to, alkyl groups such as methyl, alkyloxy groups such as methoxy, and hydroxy, halogen, cyano, sulfonyl, carboxyl, amino, and phenyl groups. One or more substituents can be present. In some embodiments, the stopper group is selected from the group consisting of a dinitrofluorophenyl group, a cyclodextrin, a nitrophenol, and combinations thereof. In some embodiments, the stopper group is p-nitrophenol (PNP). In some embodiments, the stopper group is 2,4-dinitrofluorobenzene (DNF).

In some embodiments of the present disclosure, the polyrotaxane includes one or two stopper groups and is selected from α-CD-PEG-NH-DNF or γ-CD-PS-COOH-PNP. In some embodiments, the polyrotaxane with one or two stopper groups is α-CD-PEG-NH-DNF. In some embodiments, the polyrotaxane with one or two stopper groups is γ-CD-PS-COOH-PNP.

Cross-Linkers

The polyrotaxanes of the present disclosure that include a linear polymer and one or more ring compounds can be cross-linked with a cross-linking agent, or cross-linker, to form the cross-linked polyrotaxane additives of the present disclosure.

Examples of suitable cross-linkers include, but are not limited to, melamine resins, polyisocyanate compounds, block isocyanate compounds, cyanuric chloride, trimesoyl chloride, terephthaloyl chloride, epichlorohydrin, dibromobenzene, formaldehyde, glutaraldehyde, phenylenediisocyanate, tolylene diisocyanate, divinylsulfone, bisphenol A diglycidyl ether, diisopropylethylenediamine, 1,1-carbonyldiimidazole, and alkoxy silanes. The cross-linkers can be used alone or in combination. In some embodiments, the cross-linker is selected from the group consisting of trimesoyl chloride, formaldehyde, cyanuric chloride (CC), and bisphenol A diglycidyl ether (DGE). In some embodiments, the cross-linker is diisopropylethylenediamine. In some embodiments, the cross-linker is cyanuric chloride. In some embodiments, the cross-linker is bisphenol A diglycidyl ether.

In some embodiments, the amount of cross-linker in the cross-linked polyrotaxane additive is about 1 wt % to about 10 wt %, such as about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 10 wt %, about 3 wt % to about 9 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 10 wt %, about 4 wt % to about 9 wt %, about 4 wt % to about 8 wt %, about 4 wt % to about 7 wt %, about 4 wt % to about 6 wt %, about 4 wt % to about 5 wt %, about 5 wt % to about 10 wt %, about 5 wt % to about 9 wt %, about 5 wt % to about 8 wt %, about 5 wt % to about 7 wt %, about 5 wt % to about 6 wt %, about 6 wt % to about 10 wt %, about 6 wt % to about 9 wt %, about 6 wt % to about 8 wt %, about 6 wt % to about 7 wt %, about 7 wt % to about 10 wt %, about 7 wt % to about 9 wt %, about 7 wt % to about 8 wt %, about 8 wt % to about 10 wt %, about 8 wt % to about 9 wt %, about 9 wt % to about 10 wt %, or about 1 wt %, about 2 wt %, about 3 wt %, about 4 wt %, about 5 wt %, about 6 wt %, about 7 wt %, about 8 wt %, about 9 wt %, or about 10 wt %. In some embodiments, the amount of cross-linker in the cross-linked polyrotaxane additive is about 1 wt % to about 10 wt %. In some embodiments, the amount of cross-linker in the cross-linked polyrotaxane additive is about 2 wt % to about 7 wt %. In some embodiments, the amount of cross-linker in the cross-linked polyrotaxane additive is about 2 wt % to about 4 wt %. In some embodiments, the amount of cross-linker in the cross-linked polyrotaxane additive is about 3% by weight of the cross-linked polyrotaxane additive.

Cross-Linked Polyrotaxane Additives

Thus, in some embodiments, the cross-linked polyrotaxane additive of the present disclosure contains a linear polymer and a ring compound and is cross-linked via a cross-linker as disclosed herein. In some embodiments, the linear polymer is a polysiloxane (PS) and ring compound is γ-cyclodextrin (γ-CD). In some embodiments, the linear polymer is a polyethylene glycol (PEG) and the ring compound is α-cyclodextrin (α-CD). In some embodiments, the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, where P is a polymer obtained from self-polymerization of the polyrotaxane. In some embodiments, the cross-linked polyrotaxane additive is α-CD-PEG-NH-P. In some embodiments, the α-CD-PEG-NH-P is obtained from the self-polymerization of α-CD-PEG-NH-DNF. In some embodiments, cross-linking of α-CD-PEG-NH-DNF to form α-CD-PEG-NH-P occurs after removal of the DNF stopper group. In some embodiments, the DNF stopper group is removed by a catalyst. In some embodiments, the catalyst is diisopropylethylamine (DIPEA). In some embodiments, the cross-linked polyrotaxane additive is γ-CD-PS-COOH-P. In some embodiments, the γ-CD-PS-COOH-P is obtained from the self-polymerization of γ-CD-PS-COOH-PNP. In some embodiments, cross-linking of γ-CD-PS-COOH-PNP to form γ-CD-PS-COOH-P occurs after removal of the PNP stopper group. In some embodiments, the PNP stopper group is removed by a catalyst. In some embodiments, the catalyst is DIPEA.

Method of Preparing the Cross-Linked Polyrotaxanes

Preparing the Polyrotaxane

The reaction of threading ring compounds onto the linear polymers to form the polyrotaxane can be carried out in any suitable solvent. In some embodiments, the solvent is selected from the group consisting of water, methanol, ethanol, and combinations thereof. In some embodiments, the concentration of the linear polymer and the ring compound in the solvent is about 5 wt % to about 50 wt %, such as about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 5 wt % to about 15 wt %, about 5 wt % to about 10 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 50 wt %, about 30 wt % to about 45 wt %, about 30 wt % to about 40 wt %, about 30 wt % to about 35 wt %, about 35 wt % to about 50 wt %, about 35 wt % to about 45 wt %, about 35 wt % to about 40 wt %, about 40 wt % to about 50 wt %, about 40 wt % to about 45 wt %, about 45 wt % to about 50 wt %, or about 5 wt %, about 10 wt %, about 15 wt %, about 20 wt %, about 25 wt %, about 30 wt %, about 35 wt %, about 40 wt %, about 45 wt %, or about 50 wt %. In some embodiments, the concentration of the linear polymer and the ring compound in the solvent is about 5 wt % to about 50 wt %. In some embodiments, the concentration of the linear polymer and the ring compound in the solvent is about 15 wt % to about 35 wt %. In some embodiments, the concentration of the linear polymer and the ring compound in the solvent is about 20 wt % to about 25 wt %.

In some embodiments, the reaction of threading ring compounds onto the linear polymers to form the polyrotaxane is carried out at a reaction temperature of about 0° C. to about 80° C., for example, about 0° C. to about 70° C., about 0° C. to about 60° C., about 0° C. to about 50° C., about 0° C. to about 40° C., about 0° C. to about 30° C., about 0° C. to about 25° C., about 0° C. to about 15° C., about 0° C. to about 10° C., about 0° C. to about 4° C., about 0° C. to about 2° C., about 2° C. to about 80° C., about 2° C. to about 70° C., about 2° C. to about 60° C., about 2° C. to about 50° C., about 2° C. to about 40° C., about 2° C. to about 30° C., about 2° C. to about 25° C., about 2° C. to about 15° C., about 2° C. to about 10° C., about 2° C. to about 4° C., about 4° C. to about 80° C., about 4° C. to about 70° C., about 4° C. to about 60° C., about 4° C. to about 50° C., about 4° C. to about 40° C., about 4° C. to about 30° C., about 4° C. to about 25° C., about 4° C. to about 15° C., about 4° C. to about 10° C., about 10° C. to about 80° C., about 10° C. to about 70° C., about 10° C. to about 60° C., about 10° C. to about 50° C., about 10° C. to about 40° C., about 10° C. to about 30° C., about 10° C. to about 25° C., about 10° C. to about 15° C., about 15° C. to about 80° C., about 15° C. to about 70° C., about 15° C. to about 60° C., about 15° C. to about 50° C., about 15° C. to about 40° C., about 15° C. to about 30° C., about 15° C. to about 25° C., about 25° C. to about 80° C., about 25° C. to about 70° C., about 25° C. to about 60° C., about 25° C. to about 50° C., about 25° C. to about 40° C., about 25° C. to about 30° C., about 30° C. to about 80° C., about 30° C. to about 70° C., about 30° C. to about 60° C., about 30° C. to about 50° C., about 30° C. to about 40° C., about 40° C. to about 80° C., about 40° C. to about 70° C., about 40° C. to about 60° C., about 40° C. to about 50° C., about 50° C. to about 80° C., about 50° C. to about 70° C., about 50° C. to about 60° C., about 60° C. to about 80° C., about 60° C. to about 70° C., about 70° C. to about 80° C., or about 0° C., about 2° C., about 4° C., about 5° C., about 10° C., about 15° C., about 20° C., about 25° C., about 30° C., about 35° C., about 40° C., about 45° C., about 50° C., about 55° C., about 60° C., about 65° C., about 70° C., about 75° C., or about 80° C. In some embodiments, the reaction of threading ring compounds onto the linear polymers to form the polyrotaxane is carried out at a reaction temperature of about 0° C. to about 80° C. In some embodiments, the reaction of threading ring compounds onto the linear polymers to form the polyrotaxane is carried out at a reaction temperature of about 2° C. to about 50° C. In some embodiments, the reaction of threading ring compounds onto the linear polymers to form the polyrotaxane is carried out at a reaction temperature of about 4° C. to about 25° C.

In some embodiments, the reaction of threading ring compounds onto the linear polymers to form the polyrotaxane is carried out for about 1 hour to about 24 hours, such as about 1 hour to about 18 hours, about 1 hour to about 12 hours, about 1 hour to about 5 hours, about 5 hours to about 24 hours, about 5 hours to about 18 hours, about 5 hours to about 12 hours, about 12 hours to about 24 hours, about 12 hours to about 18 hours, about 18 hours to about 24 hours, or about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours. In some embodiments, the reaction of threading ring compounds onto the linear polymers to form the polyrotaxane is carried out for about 1 hour to about 24 hours. In some embodiments, the reaction of threading ring compounds onto the linear polymers to form the polyrotaxane is carried out for about 5 hours to about 18 hours. In some embodiments, the reaction of threading ring compounds onto the linear polymers to form the polyrotaxane is carried out for about 12 hours.

The polyrotaxanes thus formed can be separated by any acceptable method, including centrifugation, filtration, and freeze drying.

Preparing the Cross-Linked Polyrotaxane

The cross-linking of the polyrotaxanes can be carried out after drying the polyrotaxane or before drying the polyrotaxane. In some embodiments, the cross-linking reaction involves dispersing the polyrotaxane in a solvent and adding the cross-linker. Examples of suitable solvents include, but are not limited to, N,N-dimethylformamide (DMF), acetonitrile, water, and mixtures thereof.

In some embodiments, the reaction includes adding a base. For example, a base can be added before the cross-linker is added to the reaction mixture, after the cross-linker is added to the reaction mixture, or simultaneously with the addition of the cross-linker. Examples of suitable bases include, but are not limited to, alkoxides bases, such as sodium hydroxide (NaOH), and amine bases, such as triethylamine (TEA).

In some embodiments, the reaction includes adding a stopper group moiety. In some embodiments, the stopper group moiety is added before addition of the cross-linker. For example, the stopper group moiety is added to the reaction mixture with the polyrotaxane. In such embodiments, a polyrotaxane is formed that includes the stopper moiety.

In some embodiments of the reaction, the reaction occurs at room temperature. In some embodiments of the reaction, the reaction mixture is heated, for example, to reflux temperature or to about 50° C., about 60° C., about 70° C., about 80° C., about 90° C., about 100° C., or higher. In some embodiments, the reaction mixture is heated to reflux for about 8 hours. In some embodiments, the reaction mixture is heated to about 100° C. for about 2 hours.

Cement Compositions Containing Cross-Linked Polyrotaxanes Also provided in this disclosure is a cement composition containing cement and a cross-linked polyrotaxane additive, for example, a cross-linked polyrotaxane additive of the present disclosure, that exhibits improved mechanical properties, for example, improved stiffness, as compared to the same cement composition that does not contain the polyrotaxane additive. In some embodiments, the cross-linked polyrotaxane additive improves the distribution of stresses throughout the cement matrix and restricts the formation and propagation of micro-cracks and fractures generated under extreme conditions. In some embodiments, the cement composition contains one or more additional agents, such as a suspending agent, an anti-foaming agent, or both. In some embodiments, the composition contains water.

Cement

The compositions of the present application contain cement and a cross-linked polyrotaxane additive of the present disclosure. The cement can be any type of cement used in the construction of subterranean oil and gas wells, or any cement used in above-ground cement construction applications. In some embodiments, the cement is Portland cement. Examples of cements that can be used in the compositions include, but are not limited to Class A, Class B, Class G, and Class H cements.

In some embodiments, the amount of cross-linked polyrotaxane additive in the cement composition is about 0.1 wt % to about 6 wt %, such as about 0.1 wt % to about 5.5 wt %, about 0.1 wt % to about 5 wt %, about 0.1 wt % to about 4.5 wt %, about 0.1 wt % to about 4 wt %, about 0.1 wt % to about 3.5 wt %, about 0.1 wt % to about 3 wt %, about 0.1 wt % to about 2.5 wt %, about 0.1 wt % to about 2 wt %, about 0.1 wt % to about 1.5 wt %, about 0.1 wt % to about 1 wt %, about 0.1 wt % to about 0.5 wt %, about 0.5 wt % to about 6 wt %, about 0.5 wt % to about 5.5 wt %, about 0.5 wt % to about 5 wt %, about 0.5 wt % to about 4.5 wt %, about 0.5 wt % to about 4 wt %, about 0.5 wt % to about 3.5 wt %, about 0.5 wt % to about 3 wt %, about 0.5 wt % to about 2.5 wt %, about 0.5 wt % to about 2 wt %, about 0.5 wt % to about 1.5 wt %, about 0.5 wt % to about 1 wt %, about 1 wt % to about 6 wt %, about 1 wt % to about 5.5 wt %, about 1 wt % to about 5 wt %, about 1 wt % to about 4.5 wt %, about 1 wt % to about 4 wt %, about 1 wt % to about 3.5 wt %, about 1 wt % to about 3 wt %, about 1 wt % to about 2.5 wt %, about 1 wt % to about 2 wt %, about 1 wt % to about 1.5 wt %, about 1.5 wt % to about 6 wt %, about 1.5 wt % to about 5.5 wt %, about 1.5 wt % to about 5 wt %, about 1.5 wt % to about 4.5 wt %, about 1.5 wt % to about 4 wt %, about 1.5 wt % to about 3.5 wt %, about 1.5 wt % to about 3 wt %, about 1.5 wt % to about 2.5 wt %, about 1.5 wt % to about 2 wt %, about 2 wt % to about 6 wt %, about 2 wt % to about 5.5 wt %, about 2 wt % to about 5 wt %, about 2 wt % to about 4.5 wt %, about 2 wt % to about 4 wt %, about 2 wt % to about 3.5 wt %, about 2 wt % to about 3 wt %, about 2 wt % to about 2.5 wt %, about 2.5 wt % to about 6 wt %, about 2.5 wt % to about 5.5 wt %, about 2.5 wt % to about 5 wt %, about 2.5 wt % to about 4.5 wt %, about 2.5 wt % to about 4 wt %, about 2.5 wt % to about 3.5 wt %, about 2.5 wt % to about 3 wt %, about 3 wt % to about 6 wt %, about 3 wt % to about 5.5 wt %, about 3 wt % to about 5 wt %, about 3 wt % to about 4.5 wt %, about 3 wt % to about 4 wt %, about 3 wt % to about 3.5 wt %, about 3.5 wt % to about 6 wt %, about 3.5 wt % to about 5.5 wt %, about 3.5 wt % to about 5 wt %, about 3.5 wt % to about 4.5 wt %, about 3.5 wt % to about 4 wt %, about 4 wt % to about 6 wt %, about 4 wt % to about 5.5 wt %, about 4 wt % to about 5 wt %, about 4 wt % to about 4.5 wt %, about 4.5 wt % to about 6 wt %, about 4.5 wt % to about 5.5 wt %, about 4.5 wt % to about 5 wt %, about 5 wt % to about 6 wt %, about 5 wt % to about 5.5 wt %, about 5.5 wt % to about 6 wt %, or about 0.1 wt %, about 0.5 wt %, about 1 wt %, about 1.5 wt %, about 2 wt %, about 2.5 wt %, about 3 wt %, about 3.5 wt %, about 4 wt %, about 4.5 wt %, about 5 wt %, about 5.5 wt %, or about 6 wt %. In some embodiments, the amount of cross-linked polyrotaxane additive in the cement composition is about 0.1 wt % to about 6 wt %. In some embodiments, the amount of cross-linked polyrotaxane additive in the cement composition is about 1 wt % to about 4 wt %. In some embodiments, the amount of cross-linked polyrotaxane additive in the cement composition is about 2 wt % to about 3 wt %.

Additional Components

In some embodiments, the cement composition includes water. In some embodiments, the cross-linked polyrotaxane of the present disclosure is dry blended with the cement and mixed with water. In some embodiments, the ratio of cement to water in the cement composition is about 50:50 wt/v, about 55:45 wt/v, about 60:40 wt/v, about 65:35 wt/v, or about 70:30 wt/v, inclusive.

In some embodiments, the cement composition contains a suspending agent, an anti-foaming agent, or both. Suitable suspending agents and anti-foaming agents include, but are not limited to, polymers, hydroxyethylcellulose, a mixture of glycols, silicon-based compounds, and compounds with carboxylate functional groups, N,N-diisopropylethylamine, triethylamine, trimethylamine, sodium hydroxide, potassium hydroxide, sodium carbonate, and potassium carbonate, and combinations thereof. In some embodiments, the suspending agent is hydroxyethylcellulose, such as the hydroxyethylcellulose sold under the tradename Natrosol™ (Ashland Specialty Ingredients, Wilmington, Del.). In some embodiments, the anti-foaming agent is a mixture of glycols, silicon-based compounds, and compounds with carboxylate functional groups. In some embodiments, the anti-foaming agent is 7500L (Fritz Industries, Mesquite, Tex.). The suspending agent, anti-foaming agent, or combination thereof can be about 0.01% to about 2.5% by weight of the cement, for example, about 0.01% to about 1%, about 0.1% to 1%, about 0.2% to about 0.5% by weight of the cement, or about 0.01%, about 0.05%, about 0.06%, about 0.1%, about 0.2%, about 0.3%, about 0.4%, about 0.5%, about 0.75%, about 1%, about 1.25%, about 1.5%, about 1.75%, or about 2% by weight of the cement. In some embodiments, when a suspending agent, an anti-foaming agent, or both are present, the amount is about 0.01% to about 0.06% by weight of the cement, such as about 0.01%, about 0.05%, or about 0.06% by weight of the cement.

Properties of the Cement Composition

In some embodiments, addition of the cross-linked polyrotaxane additive to the cement does not decrease the compressive strength of the cement as compared to the same composition without the cross-linked polyrotaxane additive. In some embodiments, addition of the cross-linked polyrotaxane additive to the cement does not decrease the compressive strength of the cement by more than about 200 pounds per square inch (psi) to about 1000 psi as compared to the compressive strength of the same cement without addition of the cross-linked polyrotaxane additive. For example, the compressive strength of the cement does not decrease by more than about 200 psi, about 300 psi, about 400 psi, about 500 psi, about 600 psi, about 700 psi, about 800 psi, about 900 psi, or about 1000 psi as compared to the compressive strength of the same cement without addition of the polymeric additive. In some embodiments, the cement composition containing the cross-linked polyrotaxane additive has a compressive strength of about 1000 psi to about 10,000 psi, about 2000 psi to about 8000 psi, or about 3500 psi to about 6500 psi, at a pressure of about 0.1 megapascal (MPa) to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a compressive strength of about 5500 psi to about 6500 psi at a pressure of about 20 MPa and a temperature of about 180° F.

In some embodiments, the cement composition of the present application exhibits improved toughness or stiffness when exposed to severe conditions (for example, extreme temperatures, pressures, or both). For example, the cement composition can exhibit improved elastic properties, such as a reduction in the Young's modulus, without exhibiting a substantial change in the compressive strength of the composition (for example, a decrease of the compressive strength of the cement by more than about 200 psi to about 1000 psi), after exposure to elevated temperatures, pressures, or both. In some embodiments, the cement composition containing the cross-linked polyrotaxane additive of the present disclosure exhibits a reduction of the Young's modulus of about 5% to about 30%, such as about 10% to about 25%, about 15% to about 20%, about 10% to about 20%, about 10% to about 30%, about 15% to about 30%, about 15% to about 25%, or a reduction of about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30%, without exhibiting a substantial change in the compressive strength of the composition (for example, a decrease of the compressive strength of the cement by more than about 200 psi to about 1000 psi), after exposure of the cement composition to elevated temperatures, as compared to the Young's modulus and compressive strength of the cement composition prior to exposure to the elevated temperatures.

In some embodiments, the cement composition of the present disclosure exhibits improved elastic properties as compared to the same composition without the cross-linked polyrotaxane additive. In some embodiments, the cement composition containing the cross-linked polyrotaxane additive has a Young's modulus of about 0.1 gigapascal (GPa) to about 40 GPa, about 3 GPa to about 25 GPa, or about 5 GPa to about 20 GPa at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a Young's modulus of about 5 GPa to about 10 GPa at a pressure of about 20 MPa and a temperature of about 180° F.

Method of Preparing a Cement Composition

Provided in the present application is a method of preparing a cement composition, such as a cement composition described in this application. In some embodiments, the method including: a) reacting a polyrotaxane comprising a linear polymer and at least one ring compound, wherein the linear polymer is threaded through the opening of the ring compound, with a cross-linker to form a cross-linked polyrotaxane additive; and b) mixing the cross-linked polyrotaxane additive with cement. In some embodiments, the cross-linked polyrotaxane additive is as described in the present disclosure.

In some embodiments, the cement slurry thus obtained is poured into a mold and cured. For example, the mold can be a 1-inch (diameter)/2-inch (length) mold. In some embodiments, the cement composition is cured at about 100° F. to about 450° F., such as about 200° F. to about 400° F., or about 300° F. under pressure of about 15 psi to about 10,000 psi, such as about 100 psi to about 5000 psi, or about 3000 psi.

Methods Using the Cement Compositions Containing Cross-Linked Polyrotaxane Additives Provided in this disclosure is a method for preventing or inhibiting the formation of micro-cracks and fractures in the cement of an oil well. In some embodiments, the method includes providing to the oil well a cement composition containing cement and a cross-linked polyrotaxane additive as described in the present disclosure. In some embodiments, the cross-linked polyrotaxane additive contains a polyrotaxane including a linear polymer having a molecular weight of about 2000 g/mol to about 50000 g/mol, and at least one ring compound, where the linear polymer is threaded through the opening of the ring compound; and a cross-linker. In some embodiments, the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, where P is a polymer obtained from self-polymerization of the polyrotaxane.

Also provided is a method for providing long-term zonal isolation in oil wells (that is, subterranean formations) including providing to an oil well a cement composition that contains cement and a cross-linked polyrotaxane additive described in this disclosure. In some embodiments, the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, where P is a polymer obtained from self-polymerization of the polyrotaxane.

In some embodiments, the providing occurs above the surface. The providing can also occur in the subterranean formation.

The subterranean formation can contain a wellbore containing a steel casing or multiple casings, a cement sheath in the annuli, and optionally a packer and a production tubing. The cement sheath, can experience stresses and annular pressure buildup due to, for example, gas flow through microchannels in the annulus, forming microannuli, and fractures (for example, microfractures), cracks and clefts within or around the cement sheath, the casing, or the production tubing. This can result in a deterioration of the mechanical properties of the cement and lead to formation of micro-cracks and fractures, which affect the production and increase the cost of operation.

In some embodiments, the cross-linked polyrotaxane additive improves the stiffness of the well cement. In some embodiments, the cement composition containing the cross-linked polyrotaxane additive is stable in downhole conditions. In some embodiments, the cross-linked polyrotaxane additive allows for uniform distribution of the stresses experienced in the cement matrix, thus enhancing the properties of the cement.

In some embodiments, the cross-linked polyrotaxane additives of the present disclosure can be employed as additives in cements for oil well construction. In some embodiments, these additives also provide similar improvement in cements used for other construction applications, for example, construction of roads, buildings, bridges, and any other application where cements can be utilized.

EXAMPLES

Example 1—Synthesis of Polyrotaxane Inclusion Complexes

Figure 2A:
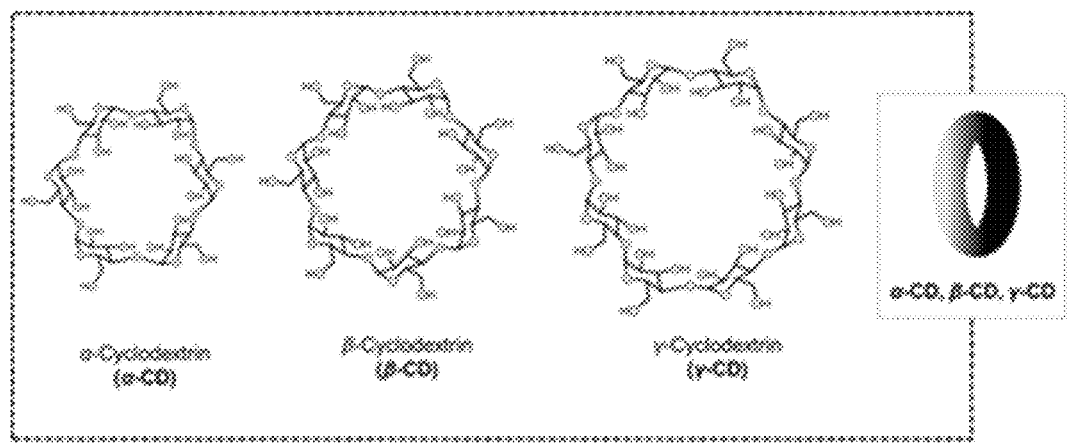
FIGS. 2A-2C represents a schematic designation of exemplary chemical compounds utilized in the polyrotaxanes of the present disclosure.
Figure 2B:
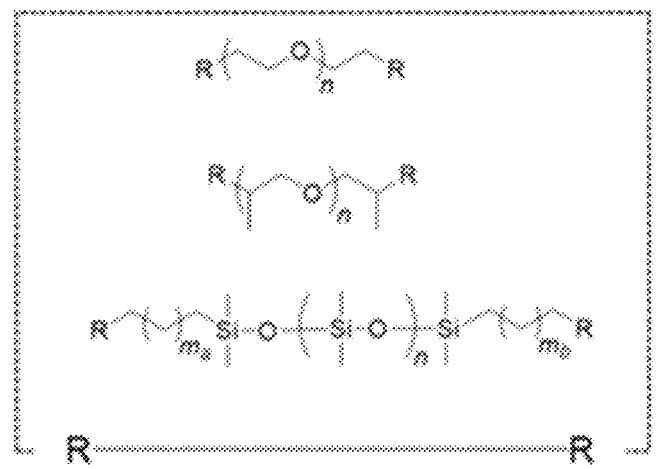
Figure 2C:
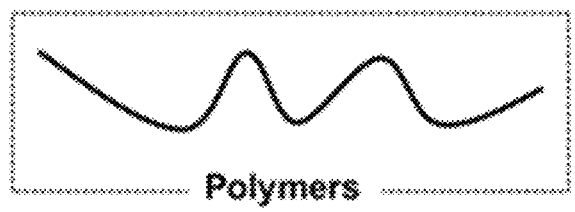

A series of polyrotaxanes were prepared from linear polymers that included polyethylene glycol (PEG), polypropylene glycol (PPG), block copolymers of PEG and PPG, and polysiloxanes (PS) that were terminated with one or more of —$NH_2$, —COOH, —OH, —$CH_2$=$CH_2$, —$COCH_2$($CH_3$)=$CH_2$, —SH, —COCl, and halides; and ring components that included α-cyclodextrin (α-CD), β-cyclodextrin (β-CD), and γ-cyclodextrin (γ-CD) (FIGS. 2A-2C).

Exemplary polyrotaxanes were prepared as follows.

Figure 3:
FIG. 3 is a schematic of an exemplary inclusion complex formed from $NH_2$-PS-$NH_2$ and γ-CD (γ-CD-PS-$NH_2$), where R is $-NH_2$.

10 grams (g) of ($NH_2$-PS-$NH_2$, MW=25000) and 30.0 g of γ-cyclodextrin (γ-CD) were dissolved in 100 milliliters (mL) deionized water and stirred at room temperature for 12 hours (h). The polyrotaxane formed as a white precipitate, which was filtered and dried at 80° C. under vacuum or freeze-dried, to obtain a white powder, designated as γ-CD-PS-$NH_2$(FIG. 3).

5 grams (g) of ($NH_2$-PEG-$NH_2$, MW=25000) and 20.0 g of α-cyclodextrin (α-CD) were dissolved in 80 milliliters (mL) deionized water and stirred at room temperature for 2 hours (h). The solution was kept at 4° C. overnight, which resulted as a gel. The polyrotaxane as a gel was freeze dried, to obtain a white powder, designated as α-CD-PEG-$NH_2$.

5 grams (g) of ($NH_2$-PPG-$NH_2$, MW=20000) and 15.0 g of β-cyclodextrin (β-CD) were dissolved in 120 milliliters (mL) deionized water and stirred at room temperature for 2 hours (h). The solution was kept at 4° C. overnight, which resulted as a gel. The polyrotaxane as a gel was freeze dried, to obtain a white powder, designated as β-CD-PPG-NH$_2$.

Similar methods were employed to obtain polyrotaxanes of PEG, PPG, PS and block polymers of PEG and PPG terminated with the one or more of —NH$_2$, —COOH, —OH, —CH$_2$=CH$_2$, —COCH$_2$(CH$_3$)=CH$_2$, —SH, —COCl, and halides, and α-cyclodextrin (α-CD), β-cyclodextrin (β-CD), γ-cyclodextrin (γ-CD), or a combination of these cyclic compounds with the linear polymers. Polyrotaxanes prepared included γ-CD-PS-NH$_2$, γ-CD-PS-COOH, α-CD-PEG-NH$_2$, α-CD-PEG-NH-DNF, β-CD-PPG-NH$_2$, and γ-CD-PS-COOH-PNP.

Example 2—Synthesis of Cross-Linked Polyrotaxanes

Figure 4:
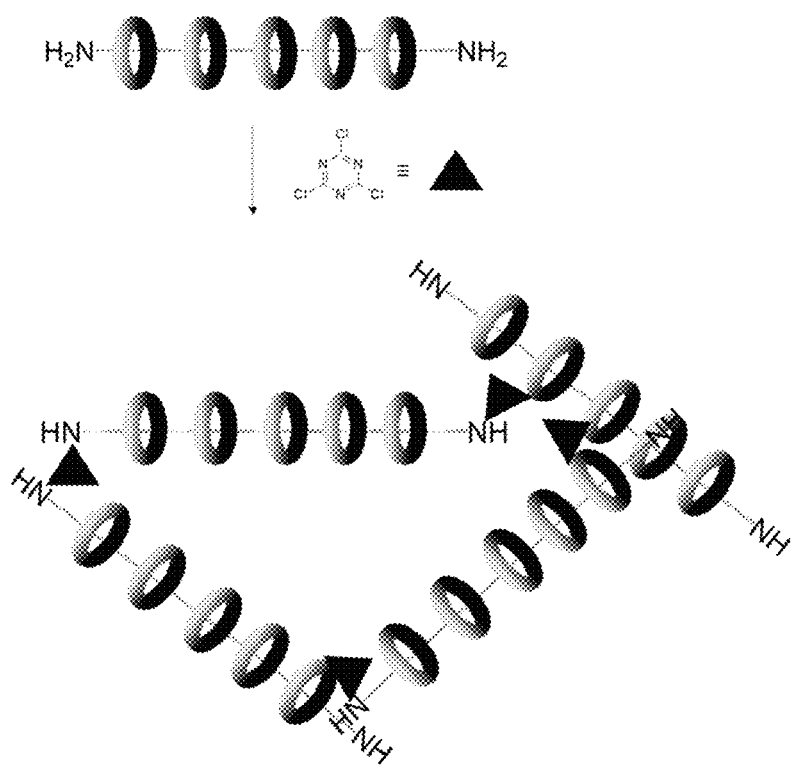
FIG. 4 is a schematic of an exemplary cross-linked polyrotaxane (γ-CD-PS-NH-CC) that is cross-linked through cyanuric chloride reaction between the amine terminal groups and hydroxyl groups of the cyclodextrins).

Several cross-linked polyrotaxanes were prepared as follows.

γ-CD-PS-NH-CC Cross-Linked Polyrotaxane 20 g of γ-CD-PS-NH$_2$ was dispersed in acetonitrile (250 mL) and triethylamine (10 mL) was added. A solution of cyanuric chloride (CC; 2 g in 20 mL acetonitrile) was added to the above mixture at room temperature with stirring. The reaction mixture was refluxed for 8 hours and the precipitates were filtered and dried at 80° C. to obtain the cross-linked polyrotaxane γ-CD-PS-NH-CC (FIG. 4). The cyanuric chloride reacted with the amine terminal groups as well as the hydroxyl groups of the cyclodextrin, which resulted in cross-linking through cyanuric chloride.

γ-CD-PS-NH-DGE Cross-Linked Polyrotaxane 20 g of γ-CD-PS-NH$_2$ was dispersed in water (250 mL). Bisphenol A diglycidyl ether (DGE; 4 g) and sodium hydroxide (3 g) were added to the dispersion. The reaction mixture was heated at 100° C. for 2 hours. The cross-linked product γ-CD-PS-NH-DGE was filtered and dried at 80° C. under vacuum overnight.

γ-CD-PS-COO-DGE Cross-Linked Polyrotaxane 20 g of γ-CD-PS-COOH was dispersed in water (250 mL). Bisphenol A diglycidyl ether (4 g) and sodium hydroxide (3 g) were added to the dispersion. The reaction mixture was heated at 100° C. for 2 hours. The cross-linked product γ-CD-PS-COO-DGE was filtered and dried at 80° C. under vacuum overnight.

α-CD-PEG-NH-P Cross-Linked Polyrotaxane 10 g of NH$_2$-PEG-NH$_2$ (MW=20000) and 30.0 g of α-cyclodextrin (α-CD) were dissolved in 100 mL deionized water, stirred at room temperature for 2 hours, then kept at 4° C. for 12 h. The inclusion complex formed as a white paste, which was dried at room temperature under vacuum or freeze-dried, to obtain a white powder, designated as α-CD-PEG-NH$_2$.

5 g of α-CD-PEG-NH$_2$, 5 mL of 2,4-dinitrofluorobenzene (DNF), and 20 mL of DMF were mixed using mortar and pestle (or in ball mills) for 20 minutes. The yellow paste was kept at room temperature for 12 hours. The yellow paste was then dissolved in dimethylsulfoxide and precipitated from water. The yellow precipitates were filtered, washed with water, and dried at 80° C. under vacuum for 12 hours to obtain α-CD-PEG-NH-DNF.

6 g of α-CD-PEG-NH-DNF was then dispersed in 25 mL of acetonitrile. Diisopropylethylenediamine (DIPEA; 0.5 mL) was added and the reaction mixture was stirred for 24 hours to obtain the cross-linked polyrotaxane α-CD-PEG-NH-P (where "P" represents "polymer" and α-CD-PEG-NH-P was the polymer obtained from self-polymerization of α-CD-PEG-NH-DNF).

γ-CD-PS-COOH-P Cross-Linked Polyrotaxane 3.14 g HOOC-PS-COOH (MW=28000), p-nitrophenol (PNP; 400 mg) and N,N'-dicyclohexylcarbodiimide (620 mg) were mixed in dichloromethane (12 mL). The reaction mixture was stirred at room temperature for 24 hours. 200 mL methanol was added to the reaction mixture and the liquid product was separated. The viscous liquid was dried at 80° C. to obtain 2.3 g of PS-COOH-PNP.

Figure 5:
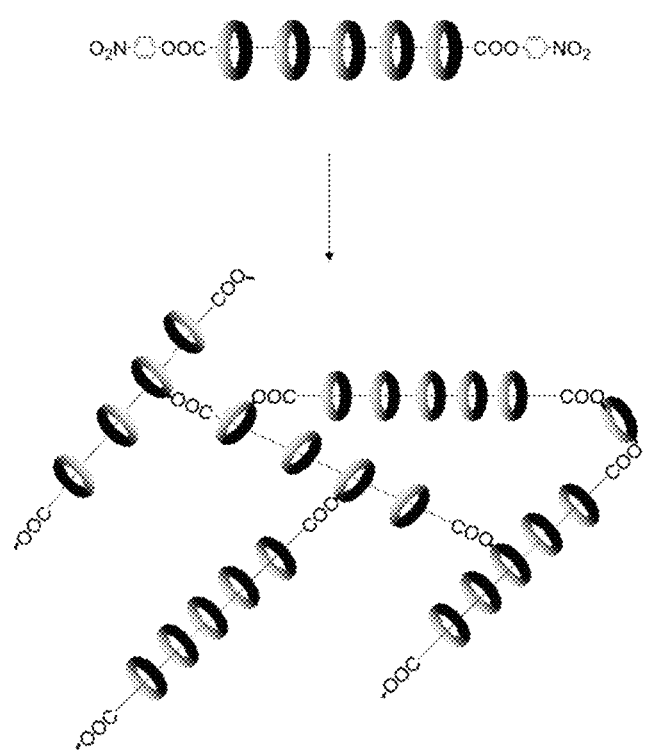
FIG. 5 is a schematic showing self-cross-linking under alkaline conditions to obtain an exemplary cross-linked polyrotaxane (γ-CD-PS-COOH-P).

2.3 g of PS-COOH-PNP was dispersed in 5 mL tetrahydrofuran and γ-CD (10 g in 140 mL water) was added to the solution. The reaction mixture was stirred at room temperature for 24 hours to obtain 7.2 g of the inclusion complex γ-CD-PS-COOH-PNP.

γ-CD-PS-COOH-PNP (6 g), diisopropylethylenediamine (0.5 mL) and acetonitrile (25 mL) were combined and stirred at room temperature for 24 hours. The precipitate was filtered, washed with water, and dried at 80° C. to obtain the cross-linked polyrotaxane γ-CD-PS-COOH-P (where "P" represents "polymer" and γ-CD-PS-COOH-P was the polymer obtained from self-polymerization of γ-CD-PS-COOH-PNP) (FIG. 5).

Example 3—Application of Cross-Linked Polyrotaxanes in Cement

Two cement compositions were prepared (Cement A and Cement B) as shown in Table 1. Each cement composition contained Class G cement, a suspending agent (hydroxyethylcellulose, sold as Natrosol™; Ashland Specialty Ingredients, Wilmington, Del.), deionized water, and an anti-foaming agent (7500L; Fritz Industries, Mesquite, Tex.). Cement B contained the cross-linked polyrotaxane γ-CD-PS-COOH-P prepared according to Example 2, while Cement A did not contain any cross-linked polyrotaxane.

TABLE 1

| Cement formulations | | |
| --- | --- | --- |
| Formulations | Constituents | Amount/g |
| Cement A | Class G cement | 617.5 |
| | Suspending agent | 0.5 |
| | Deionized water | 408.6 |
| | Anti-foaming agent | 0.2 mL |
| Cement B | Class G cement | 617.5 |
| | Suspending agent | 0.5 |
| | γ-CD-PS-COOH-P | 9.3 |
| | Deionized water | 408.6 |
| | Anti-foaming agent | 0.1 mL |

Cement A was prepared by blending Class G cement with a suspending agent. The blended cement mixture was added to deionized water at 8000 rpm, followed by mixing at 12000 rpm for 35 seconds. An anti-foaming agent was added and the composition was stirred at 12000 rpm for 10 seconds. The cement slurry was poured into a 1"-diameter cylinder and was cured at 180° F. and 3000 psi for 5 days. Cement samples of 1'/2" size were used for mechanical testing.

Cement B was prepared by dry blending Class G cement with a suspending agent and γ-CD-PS-COOH-P. The blended cement mixture was added to deionized water at 8000 rpm, followed by mixing at 12000 rpm for 35 seconds. An antifoaming agent was added and stirred at 12000 rpm for 10 seconds. The cement slurry was poured into a 1"-diameter cylinder and was cured at 180° F. and 3000 psi for 5 days. Cement samples of 1'/2" size were used for mechanical testing.

The compressive strengths of Cement A and Cement B under confined pressure of 20 MPa at 77° F. and 180° F. were tested. The results are shown in Table 2.

Static confined measurements provided the assessment of cement under hydrostatic and triaxial loading at variable pressure and temperatures. This study was carried out with a laboratory instrument, AutoLab 3000 (New England Research; White River Junction, Vt.), a high-pressure tri-axial press capable of generating confining pressures. The test equipment consisted of an axial loading system, a confining pressure supply system, and data acquisition software. These measurements required cylindrical samples with a diameter of two inches and a length of four inches. The specimens were jacketed and placed between steel end-caps. Static mechanical properties were measured using strain gauge sensors, which were mounted on the sample to measure axial deformation and radial deformation. A series of laboratory tests were performed to examine the fatigue behavior of cement when subjected to cyclic loading under triaxial compression conditions. After the sample was placed in a triaxial cell, a confining pressure was applied. The cyclic axial load was applied in the form of triangular waveforms. Each sample was deformed over three cyclic loading series. In each cyclic loading series, a differential stress was applied during the cyclic loading; and various peak axial stresses were applied during cyclic loading. Because uniaxial stress was applied on the sample, this module was used to calculate Young's modulus and Poisson's ratio to measure sample strain.

TABLE 2

Compressive strengths of Cement A and Cement B

| Set-cement | Compressive strength (psi) | |
|---|---|---|
| samples | 77° F. | 180° F. |
| Cement A | 5523 | 5881 |
| Cement B | 5341 | 5061 |

The bulk modulus, shear modulus, and Young's modulus of Cement A and Cement B under confined pressure of 20 MPa at 77° F. and 180° F. were tested as described. The results are shown in Table 3.

TABLE 3

Bulk, shear, and Young's modulus of Cement A and B

| Set-cement samples | Bulk Modulus# (GPa) | | Shear modulus (GPa) | | Young's Modulus (GPa) | |
|---|---|---|---|---|---|---|
| | 77° F. | 180° F. | 77° F. | 180° F. | 77° F. | 180° F. |
| Cement A | 3.4 | 3.6 | 3.8 | 3.4 | 12.2 | 12.6 |
| Cement B | 3.7 | 3.5 | 3.5 | 3.8 | 8.5 | 8.1 | confined pressure = 10.8 MPa

What is claimed is:

1. A cement composition comprising:
   cement; and
   a cross-linked polyrotaxane additive comprising:
      a polyrotaxane comprising a linear polymer and at least one ring compound, wherein the linear polymer is threaded through the opening of the ring compound; and
      a cross-linker.

2. The composition of claim 1, wherein the linear polymer is selected from the group consisting of a polyethylene glycol (PEG), a propylene glycol (PPG), a block copolymer of PEG and PPG, and a polysiloxane (PS).

3. The composition of claim 2, wherein the linear polymer terminates with one or more of —$NH_2$, —COOH, —OH, —$CH_2$=$CH_2$, —$COCH_2(CH_3)$=$CH_2$, —SH, —COCl, or a halide.

4. The composition of claim 3, wherein the linear polymer is a PEG or a polysiloxane that terminates with one or more $NH_2$ groups.

5. The composition of claim 3, wherein the linear polymer is a PEG or a polysiloxane that terminates with one or more —COOH groups.

6. The composition of claim 1, wherein the linear polymer has a molecular weight of about 2000 g/mol to about 50000 g/mol, about 8000 g/mol to about 30,000 g/mol, or about 15,000 g/mol to about 25,000 g/mol.

7. The composition of claim 1, wherein the linear polymer has a molecular weight of about 20,000 g/mol, about 25,000 g/mol, or about 28,000 g/mol.

8. The composition of claim 1, wherein the ring compound is a cyclodextrin or cyclodextrin derivative.

9. The composition of claim 8, wherein the cyclodextrin is selected from the group consisting of α-cyclodextrin (α-CD), β-cyclodextrin (β-CD), and γ-cyclodextrin (γ-CD) and combinations thereof.

10. The composition of claim 1, wherein the amount of ring compound in the polyrotaxane is between about 20% to about 70%, about 50% to about 60%, or about 30% to about 40% by weight of the polyrotaxane.

11. The composition of claim 1, wherein the polyrotaxane is selected from the group consisting of γ-CD-PS-$NH_2$, γ-CD-PS-COOH, β-CD-PPG-$NH_2$, and α-CD-PEG-$NH_2$.

12. The composition of claim 1, wherein the polyrotaxane comprises a stopper group at one or both ends of the linear polymer.

13. The composition of claim 12, wherein the stopper group is selected from the group consisting of a dinitrofluorophenyl group, a cyclodextrin, a nitrophenol, and combinations thereof.

14. The composition of claim 13, wherein the stopper group is p-nitrophenol (PNP) or 2,4-dinitrofluorobenzene (DNF).

15. The composition of claim 13, wherein the polyrotaxane is α-CD-PEG-NH-DNF or γ-CD-PS-COOH-PNP.

16. The composition of claim 1, wherein the cross-linker is selected from the group consisting of trimesoyl chloride, formaldehyde, cyanuric chloride (CC), and bisphenol A diglycidyl ether (DGE).

17. The composition of claim 1, wherein the amount of cross-linker in the cross-linked polyrotaxane additive is between about 1% to about 10%, or about 2% to about 7%, or about 2% to about 4% by weight of the cross-linked polyrotaxane additive.

18. The composition of claim 17, wherein the amount of cross-linker in the cross-linked polyrotaxane additive is about 3% by weight of the cross-linked polyrotaxane additive.

19. The composition of claim 1, wherein the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, wherein P is a polymer obtained from self-polymerization of the polyrotaxane.

20. The composition of claim 19, wherein the cross-linked polyrotaxane additive is γ-CD-PS-COOH-P.

21. The composition of claim 1, wherein the amount of cross-linked polyrotaxane additive in the cement composition is between about 0.1% to about 6%, about 1% to about 4%, or about 2% to about 3% by weight of the cement composition.

22. The composition of claim 21, wherein the amount of cross-linked polyrotaxane additive in the cement composition is about 0.8% to about 1% by weight of the cement composition.

23. The composition of claim 1, wherein the cement composition comprises one or more of a suspending agent or an anti-foaming agent.

24. The composition of claim 23, wherein the one or more suspending agent or anti-foaming agent is hydroxyethylcellulose or a mixture of glycols, silicon-based compounds, and compounds with carboxylate functional groups.

25. The composition of claim 1, wherein the cement composition further comprises water.

26. The composition of claim 25, wherein the ratio of cement to water in the cement composition is about 50:50, about 60:40, or about 70:30 wt/v.

27. The composition of claim 1, wherein the cement composition has a Young's modulus of about 0.1 GPa to about 40 GPa, about 3 GPa to about 25 GPa, or about 5 GPa to about 20 GPa at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F.

28. The composition of claim 27, wherein the cement composition has a Young's modulus of about 5 GPa to about 10 GPa at a pressure of about 20 MPa and a temperature of about 180° F.

29. The composition of claim 1, wherein the cement composition has a compressive strength of about 1000 psi to about 10,000 psi, about 2000 psi to about 8000 psi, or about 3500 psi to about 6500 psi, at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F.

30. The composition of claim 29, wherein the cement composition has a compressive strength of about 4500 psi to about 5500 psi at a pressure of about 20 MPa and a temperature of about 180° F.

31. The composition of claim 1, wherein the cement composition exhibits improved stiffness as compared to the same composition without the cross-linked polyrotaxane additive.

32. A method of preparing a cement composition, comprising:
   a) reacting a polyrotaxane comprising a linear polymer and at least one ring compound, wherein the linear polymer is threaded through the opening of the ring compound, with a cross-linker to form a cross-linked polyrotaxane additive; and
   b) mixing the cross-linked polyrotaxane additive with cement.

33. The method of claim 32, wherein the linear polymer is selected from the group consisting of a polyethylene glycol (PEG), a propylene glycol (PPG), a block copolymer of PEG and PPG, and a polysiloxane (PS).

34. The method of claim 33, wherein the linear polymer terminates with one or more of $-NH_2$, $-COOH$, $-OH$, $-CH_2=CH_2$, $-COCH_2(CH_3)=CH_2$, $-SH$, $-COCl$, or a halide.

35. The method of claim 32, wherein the linear polymer has a molecular weight of about 2000 g/mol to about 50000 g/mol, about 8000 g/mol to about 30,000 g/mol, or about 15,000 g/mol to about 25,000 g/mol.

36. The method of claim 32, wherein the ring compound is a cyclodextrin or cyclodextrin derivative.

37. The method of claim 36, wherein the cyclodextrin is selected from the group consisting of α-cyclodextrin (α-CD), β-cyclodextrin (β-CD), and γ-cyclodextrin (γ-CD) and combinations thereof.

38. The method of claim 32, wherein the amount of ring compound in the polyrotaxane is between about 20% to about 70%, about 50% to about 60%, or about 30% to about 40% by weight of the polyrotaxane.

39. The method of claim 32, wherein the polyrotaxane is selected from the group consisting of γ-CD-PS-NH$_2$, γ-CD-PS-COOH, β-CD-PPG-NH$_2$, and α-CD-PEG-NH$_2$.

40. The method of claim 32, wherein the polyrotaxane comprises a stopper group at one or both ends of the linear polymer.

41. The method of claim 40, wherein the stopper group is selected from the group consisting of a dinitrofluorophenyl group, a cyclodextrin, a nitrophenol, and combinations thereof.

42. The method of claim 41, wherein the stopper group is p-nitrophenol (PNP) or 2,4-dinitrofluorobenzene (DNF).

43. The method of claim 41, wherein the polyrotaxane is α-CD-PEG-NH-DNF or γ-CD-PS-COOH-PNP.

44. The method of claim 32, wherein the cross-linker is selected from the group consisting of trimesoyl chloride, formaldehyde, cyanuric chloride (CC), and bisphenol A diglycidyl ether (DGE).

45. The method of claim 32, wherein the amount of cross-linker in the cross-linked polyrotaxane additive is between about 1% to about 10%, or about 2% to about 7%, or about 2% to about 4% by weight of the cross-linked polyrotaxane additive.

46. The method of claim 32, wherein the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, wherein P is a polymer obtained from self-polymerization of the polyrotaxane.

47. The method of claim 46, wherein the cross-linked polyrotaxane additive is γ-CD-PS-COOH-P.

48. The method of claim 32, wherein the amount of cross-linked polyrotaxane additive in the cement composition is between about 0.1% to about 6%, about 1% to about 4%, or about 2% to about 3% by weight of the cement composition.

49. The method of claim 32, wherein the cement composition comprises one or more of a suspending agent or an anti-foaming agent.

50. The method of claim 32, wherein the cement composition further comprises water.

51. The method of claim 50, wherein the ratio of cement to water in the cement composition is about 50:50, about 60:40, or about 70:30 wt/v.

52. A method for preventing the formation of microcracks and fractures in the cement of an oil well, the method comprising providing to the oil well a cement composition comprising cement and a cross-linked polyrotaxane additive, the cross-linked polyrotaxane additive comprising:
   a polyrotaxane comprising a linear polymer having a molecular weight of about 2000 g/mol to about 50000 g/mol, and at least one ring compound, wherein the linear polymer is threaded through the opening of the ring compound; and
   a cross-linker.

53. The method of claim 52, wherein the linear polymer is selected from the group consisting of a polyethylene glycol (PEG), a propylene glycol (PPG), a block copolymer of PEG and PPG, and a polysiloxane (PS).

54. The method of claim 53, wherein the linear polymer terminates with one or more of —$NH_2$, —COOH, —OH, —$CH_2$=$CH_2$, —$COCH_2(CH_3)$=$CH_2$, —SH, —COCl, or a halide.

55. The method of claim 52, wherein the ring compound is a cyclodextrin selected from the group consisting of α-cyclodextrin (α-CD), β-cyclodextrin (β-CD), and γ-cyclodextrin (γ-CD) and combinations thereof.

56. The method of claim 52, wherein the polyrotaxane is selected from the group consisting of γ-CD-PS-$NH_2$, γ-CD-PS-COOH, β-CD-PPG-$NH_2$, and α-CD-PEG-$NH_2$.

57. The method of claim 52, wherein the polyrotaxane comprises a stopper group at one or both ends of the linear polymer.

58. The method of claim 57, wherein the stopper group is selected from the group consisting of a dinitrofluorophenyl group, a cyclodextrin, a nitrophenol, and combinations thereof.

59. The method of claim 58, wherein the polyrotaxane is α-CD-PEG-NH-DNF or γ-CD-PS-COOH-PNP.

60. The method of claim 52, wherein the cross-linker is selected from the group consisting of trimesoyl chloride, formaldehyde, cyanuric chloride (CC), and bisphenol A diglycidyl ether (DGE).

61. The method of claim 52, wherein the amount of cross-linker in the cross-linked polyrotaxane additive is between about 1% to about 10%, or about 2% to about 7%, or about 2% to about 4% by weight of the cross-linked polyrotaxane additive.

62. The method of claim 52, wherein the cross-linked polyrotaxane additive is selected from the group consisting of γ-CD-PS-NH-CC, γ-CD-PS-NH-DGE, γ-CD-PS-COO-DGE, α-CD-PEG-NH-P, and γ-CD-PS-COOH-P, wherein P is a polymer obtained from self-polymerization of the polyrotaxane.

63. The method of claim 52, wherein the amount of cross-linked polyrotaxane additive in the cement composition is between about 0.1% to about 6%, about 1% to about 4%, or about 2% to about 3% by weight of the cement composition.

64. The method of claim 52, wherein the cement composition comprises one or more of a suspending agent or an anti-foaming agent.

65. The method of claim 52, wherein the cement composition further comprises water.

66. The method of claim 65, wherein the ratio of cement to water in the cement composition is about 50:50, about 60:40, or about 70:30 wt/v.

* * * * *